US00RE35188E

United States Patent [19]

Howard

[11] E Patent Number: Re. 35,188

[45] Reissued Date of Patent: Mar. 26, 1996

[54] GAMING AND AMUSEMENT MACHINES AND REELS FOR THEM

[75] Inventor: Terence Howard, Nottingham, England

[73] Assignee: Bell-Fruit Manufacturing Company Limited, Nottingham, England

[21] Appl. No.: 328,900

[22] Filed: Oct. 25, 1994

Related U.S. Patent Documents

Reissue of:

[64] Patent No.: 5,228,693
Issued: Jul. 20, 1993
Appl. No.: 833,855
Filed: Feb. 11, 1992

Related U.S. Application Data

[63] Continuation of PCT/GB90/01257, filed Aug. 10, 1990.

[30] Foreign Application Priority Data

Aug. 10, 1990 [GB] United Kingdom ..... 8918448

[51] Int. Cl.[6] ..... G07F 17/34

[52] U.S. Cl. ..... 273/143 R

[58] Field of Search ..... 273/143 R, 138 A

[56] References Cited

U.S. PATENT DOCUMENTS

| | | | |
|---|---|---|---|
| 2,035,084 | 3/1936 | May | 273/143 |
| 2,545,644 | 3/1951 | Benton et al. | 273/143 |
| 4,249,737 | 2/1981 | Hancherick | 273/143 |
| 4,262,906 | 4/1981 | Heywood | 273/143 |
| 4,534,560 | 8/1985 | Okada | 273/143 |
| 4,621,815 | 11/1986 | Yamamoto | 273/143 |
| 4,711,452 | 12/1987 | Dickinson et al. | 273/143 |
| 4,765,078 | 8/1988 | Yamamoto | 40/309 |
| 4,773,648 | 9/1988 | Itoh | 273/143 |
| 4,874,172 | 10/1989 | Nakamura | 273/143 |
| 4,912,389 | 3/1990 | Eguchi | 318/696 |

FOREIGN PATENT DOCUMENTS

| | | | |
|---|---|---|---|
| 0142370 | 5/1985 | European Pat. Off. | 273/143 R |
| 0317123 | 5/1989 | European Pat. Off. | 273/143 R |
| 2921159 | 4/1980 | Germany | 273/143 R |
| 412289 | 6/1934 | United Kingdom | 40/472 |
| 1233081 | 5/1971 | United Kingdom | 273/143 R |
| 1488658 | 10/1977 | United Kingdom | 273/143 R |
| 2092795 | 8/1982 | United Kingdom | 273/143 R |
| 2165074 | 4/1986 | United Kingdom | 273/143 R |
| 2165387 | 4/1986 | United Kingdom | 273/143 R |
| 2183883 | 6/1987 | United Kingdom | 273/143 R |

*Primary Examiner*—Benjamin H. Layno
*Attorney, Agent, or Firm*—Christensen O'Connor Johnson & Kindness

[57] ABSTRACT

In a reel for a fruit machine, a reel has standard symbols or fruit, on which secondary symbols, for example, numbers, are superimposed. The reel has a first, inner strip on which the standard symbols appear, the strip being carried by a reel drum. The secondary symbols appear on a second, outer strip glued to the first strip. The second strip is mostly transparent so that the standard symbols may be viewed with the secondary symbols superimposed on them.

12 Claims, 4 Drawing Sheets

GAMING AND AMUSEMENT MACHINES AND REELS FOR THEM

Matter enclosed in heavy brackets [ ] appears in the original patent but forms no part of this reissue specification; matter printed in italics indicates the additions made by reissue.

*This application is a continuation of prior copending international PCT Application No. PCT/GB/01257, filed on Aug. 10, 1990, the benefit of the filing date which is hereby claimed under 35 U.S.C. §120.*

This invention relates to gaming and amusement machines and in particular to those commonly known as fruit machines. In such machines a number of reels, usually three or four, carrying symbols on their peripheries are spun and then stopped at random. If they come to a halt with any one of a number of selected combinations of symbols on a so-called 'win line', an award is made or other equivalent benefit is obtained. Such a machine will hereinafter be referred to as of the kind set forth.

Traditionally thee reels have been mechanical, rotating side by side on a common axis and with the symbols carried on their peripheral cylindrical surfaces. This is almost universal although in certain countries, e.g. Germany, the reels are sometimes in the form of flat discs with the symbols arranged in a ring on one face. Even an arrangement involving each reel being in the form of a frustum of a cone, with the peripheries lying in a common conical surface, is known.

Attempts have been made to get away from the simple printed representation of the symbols, usually fruit such as plums, cherries, oranges and so on, and it has been proposed to project the symbols optically in turn onto a flat translucent screen, the so-called Panascope system. We have ourselves proposed to use a video screen on which an electrically generated image of the rotating reels is displayed. However these alternatives lack the contrast and brightness of a colour-printed two-dimensional picture of the symbol and so there has lately been a reversion to the mechanical reels with the symbols on their peripheries.

There are many times in which minor variations upon the standard symbols appearing on the reels are needed. It is, for instance, common practice to include elements of more than one game feature at concurrent positions of the reel-strip; for example, a plum may be over printed with the number "1". Printing elements for of these occurrences could be made up, but this would be potentially costly and inconvenient, as for example shown above, the next appearance of a plum may not need any overprinting, the next a "2" etc. Advantage cannot therefore be taken of the fact that the standard background symbol in the cases outlined is a plum as individual printing elements for each variation would need to be made.

According to a first aspect the invention consists in a reel for a gaming or amusement machine comprising a first reel-strip, a second reel-strip, and support means supporting the strips in a curved configuration, the first and second strips extending around the support means and each carrying indicia, or symbols, the arrangement being such that at [ at] least one angular position of the reel the first and second strips each have indicia, [characterised] *characterized* in that the indicia of the first strip and the indicia of the second strip can both be seen simultaneously at all times when they are registered with a viewing window of a gaming or amusement machine.

Preferably the second strip is generally transparent, but carries its indicia and the second strip overlies the first strip such that at least some of the indicia of the first strip are at least partially visible through the second strip. At least one of the indicia or symbols of the second strip may be superimposed upon at least one of the indicia or symbols of the first strip.

Preferably the first strip has a uniformly smooth surface and has the symbols printed upon it; that is to the first surface is flat or smoothly curved.

The first and second strips may be secured together.

Preferably the first strip has sunken regions in which symbols or indicia are provided. The first strip may have profiled symbols formed in or on it in three dimensions. The second strip may be transparent except for its symbols or indicia, and all of the symbols or indicia of the first strip may be identifiable despite the presence of the indicia or symbols of the second strip.

According to a second aspect the invention consists in a reel-strip which is generally transparent but which carries symbols or indicia and is adapted to be applied over or alongside an existing reel or reel-strips so as to form a reel in accordance with the first aspect of the invention.

According to a third aspect the invention consists in a two-layer reel-strip for use in a reel of a gaming or amusement machine comprising a first lower strip bearing symbols or indicia and a second, upper, strip which is largely transparent but which also carries indicia or symbols, [ characterised] *characterized* in that the indicia or symbols of the first and second strips are visible simultaneously by means of the same light source.

According to a fourth aspect the invention consists in a gaming or amusement machine [ characterised] *characterized* in that it includes a reel in accordance with the first aspect of the invention, or a reel-strip in accordance with the third aspect of the invention.

According to a fifth aspect the invention consists in method of forming a reel for gaming and amusement machines comprising taking a reel-strip in accordance with the second or third aspects of the invention and applying it to a reel.

It will be [ been] *seen* that in order to provide a variation in superimposed symbols it is only necessary to change the positions and style of the secondary symbols printed on the second strip. This is much simpler and involves far less work than forming the secondary symbols integrally with the standard symbols. It is only necessary to provide a former for each of the standard symbols and each of the secondary symbols in order that all possible combinations may be obtained.

An embodiment of the present invention will now be described, by way of example only, with reference to the accompanying drawings in which.

Figure 1:
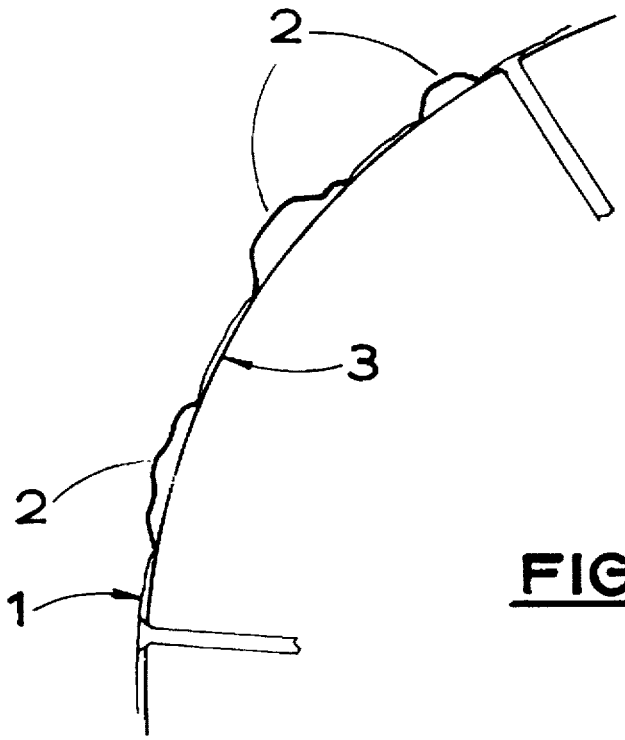
FIG.1. PRIOR ART.
FIG. 1 is a sketch view showing in profile a known type of reel-strip attached to a reel drum of a fruit machine.

FIG. 1 shows a known type of reel-strip having embossed symbols 2 formed in relief which stand out from the surface of the strip. The strip 1 is attached to the outer periphery of a conventional reel drum 3. The strip with embossed symbols 2 of this form, however, suffers from the disadvantage that the reel-strip material deforms under the embossing process and consequently the reel-strip does not fit very well onto the reel drum and there is a risk of fouling during rotation.

Figure 2:
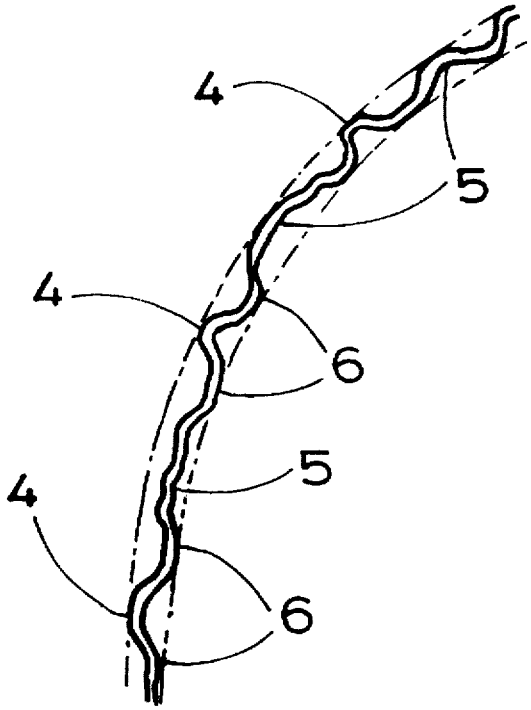
FIG. 2 is a side sectional view of a curved reel-strip suitable for use in accordance with the invention.
Figure 3:
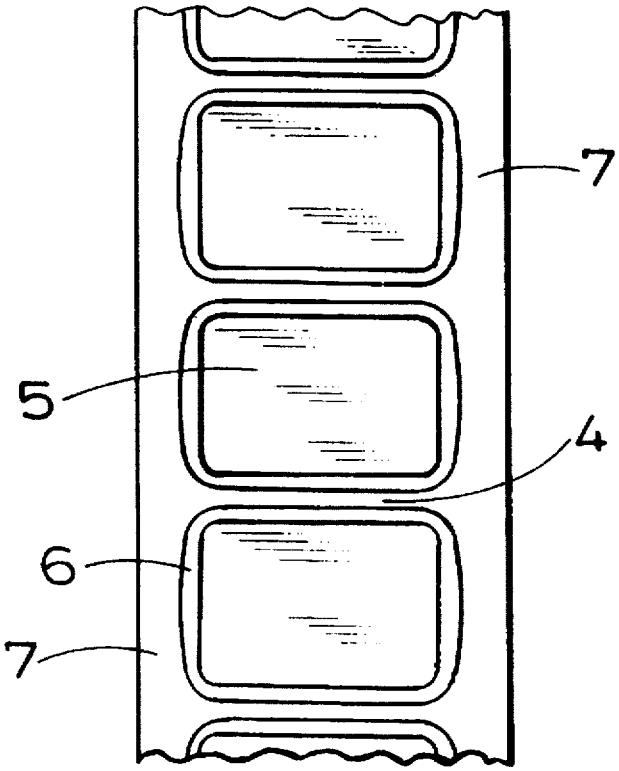
FIG. 3 is a front view of the reel-strip of FIG. 2.
Figure 4:
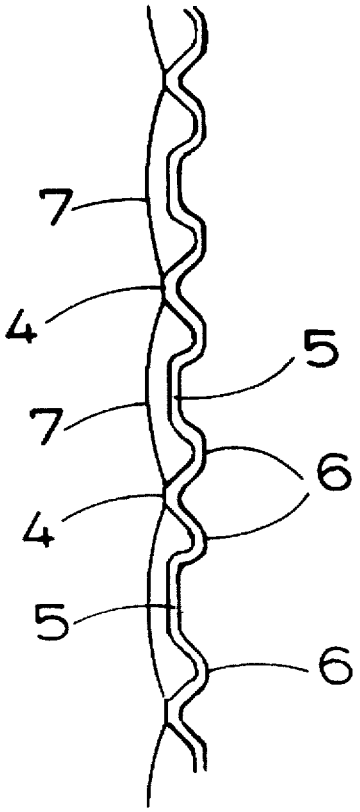
FIG. 4 is a side sectional view of the strip of FIGS. 2 and 3 in flat form.

The reel-strip shown in FIGS. 2 to 4 may be formed from thin plastics sheet material and has raised sections 4 and a plurality of symbols 5 formed in relief surrounded by sunken surrounding regions 6. As shown in FIG. 4 the reel-strip may initially be made in flat form before it takes up its curved position in use as part of a fruit machine reel. In its flat form the borders 7 of the reel-strip may bulge slightly above the raised sections 4 but in its curved form (FIG. 2) they will normally have the same radius from the centre of the reel as the raised sections 4 between the symbols 5 and their surrounding sunken regions 6.

It will be appreciated that the symbols 5 have a maximum height above their surrounding regions 6 such that when the strip forms at least part of a reel assembly, the radius of the outermost surface of the fruit symbols 5 does not exceed the rotational radius of the front of the reel constituted by the raised sections 4 and the borders 7 of the strip.

Figure 7:
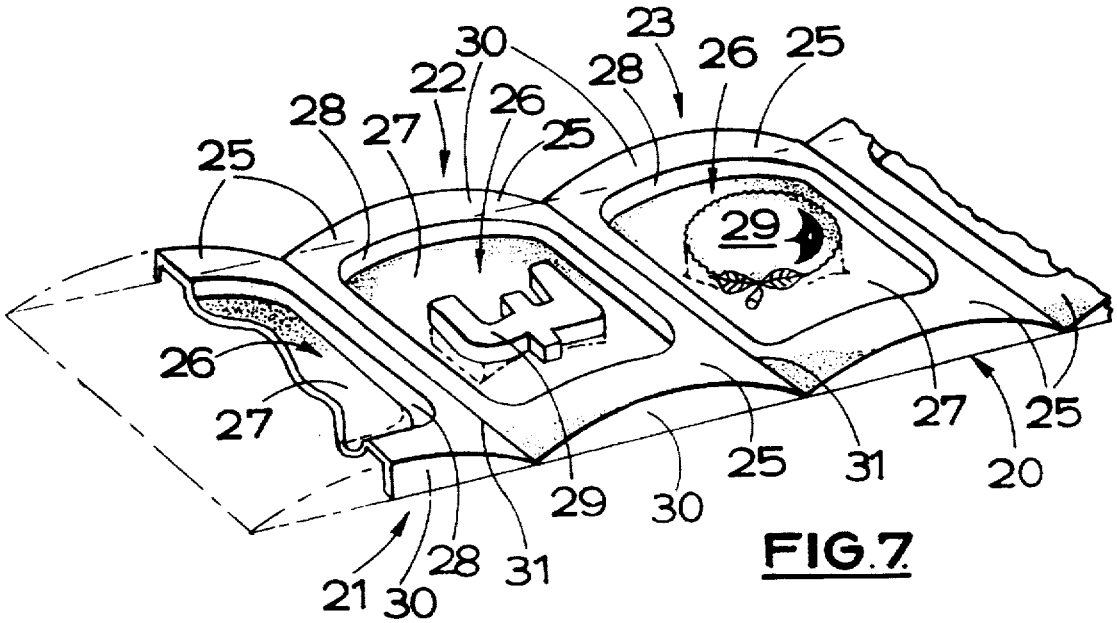
FIG. 7 shows a reel-strip in accordance with the invention in a flat configuration.
Figure 8:
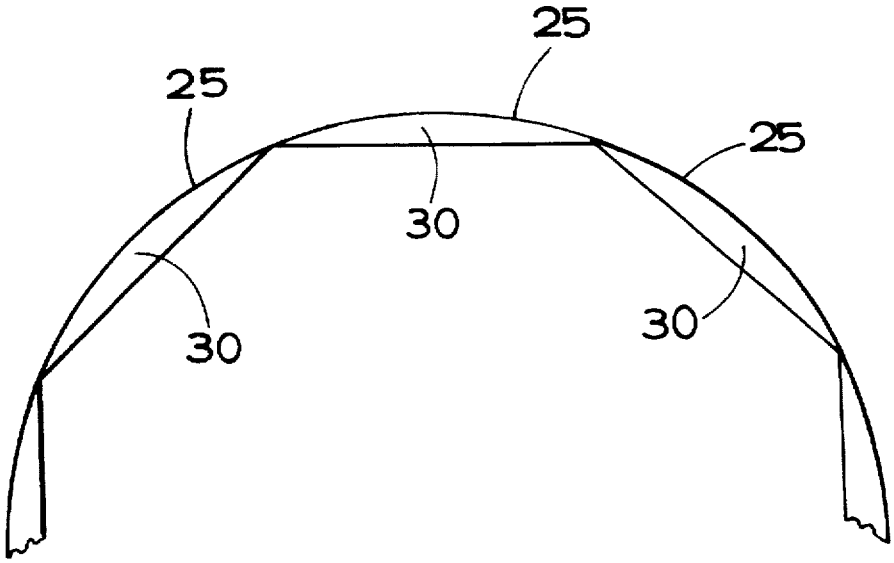
FIG. 8 shows a reel-strip of FIG. 7 in its configuration of use.

Another reel-strip suitable for use in the first aspect of the invention is shown in FIGS. 7 and 8 FIG. 7 shows a moulded plastics reel-strip 20 having adjacent segments 21, 22, 23 and 24 in a flat configuration. The strip 20 is a vacuum moulded thin plastics component, each segment comprises a part-cylindrical frame surface 25, a recess 26, a base surface 27 of the recess, side surfaces 28 of the recess, a relief symbol 29 standing proud of the base surface 27, and two opposed spaced side walls 30. A line of flexing, or weakness 31 is provided between the adjacent frame surfaces 25 of adjacent segments.

The symbols 29 project above the respective base surfaces 27 to *the* extent which is not more than the depth of the recess, thus staying at or below the level of the respective frame surfaces 29. The symbols 29 may have a substantially flat upper surface, such as the pound symbol of segment 22, or a dimpled or profiled surface such as the orange of segment 23.

The side walls 30 are segments of a circle and when the strip 20 is in use (see FIG. 8) the frame surfaces 25 lie in a common cylinder, with the side walls 25 being segments of a first or a second circle (depending upon which side of the segments the walls are provided).

Figure 5:
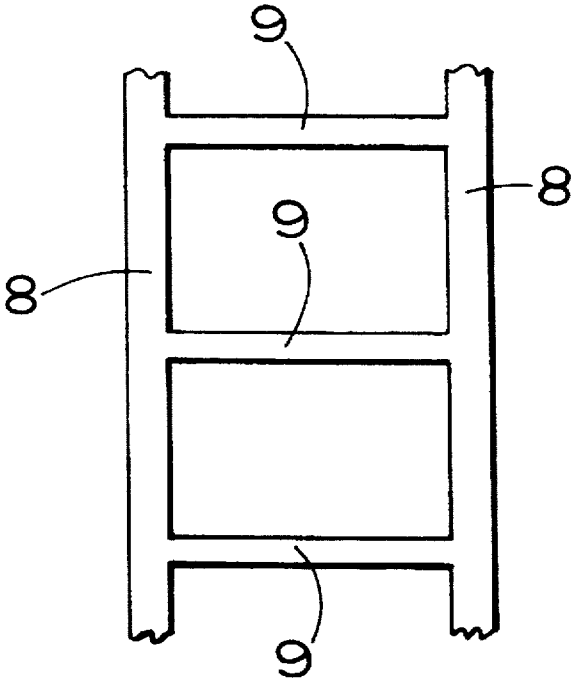
FIG. 5 is a front view of a support element for the reel-strip of FIGS. 2 to 4.
Figure 6:
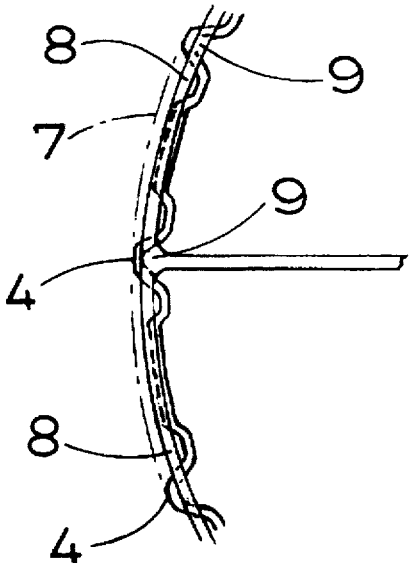
FIG. 6 is a sectional view showing a reel-strip suitable for use with the invention mounted on the support element of FIG. 5.

The reel-strips of FIGS. 2 to 4 and 7 and 8 can be mounted readily on a support element of skeletal form having ring members 8 connected at regular intervals by transverse cross-members 9 (FIGS. 5 and 6). In this arrangement the sunken surrounding regions 6 which "frame" the symbols 5 can be positively located between the cross-members 9, thus locating accurately the position of the symbols on the support element. The support element need have only one ring provided with transverse support means, and/or could comprise a dished plate.

Figure 9:
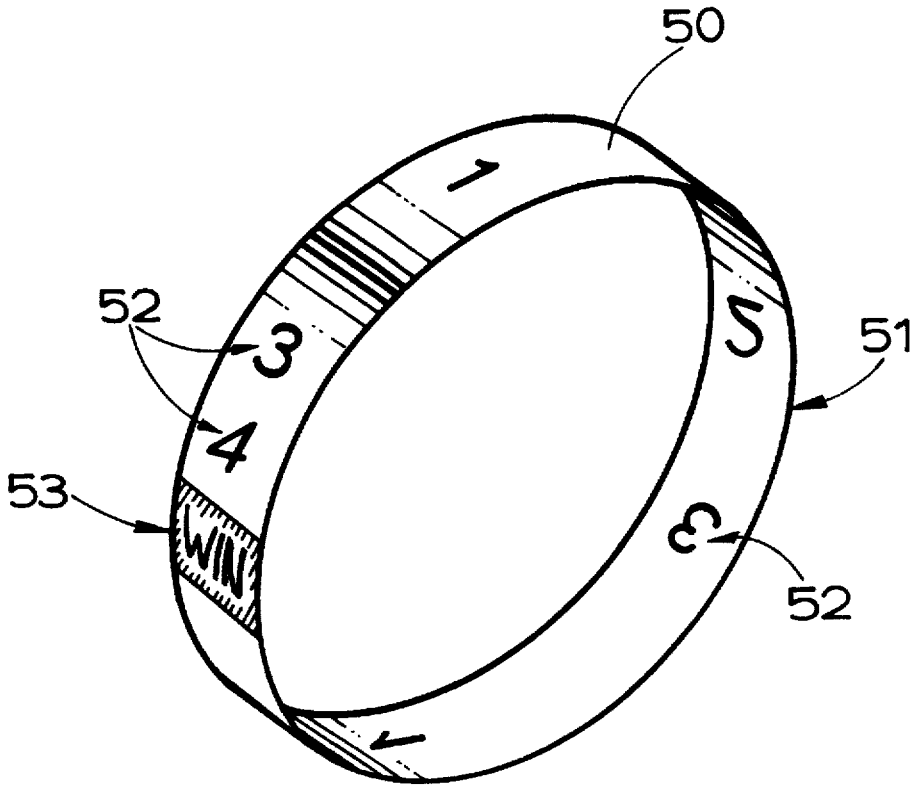
FIG. 9 shows a numbered strip for use in combination with the reel-strip of FIGS. 2 to 4, FIG. 6, and FIGS. 7 and 8.

FIG. 9 shows a transparent film or strip 50 formed into a ring 51. The ring 51 is part transparent, but carries numbers 52 indicative in use of the number of credit points a user obtains when the number appears in the win line, or lines, of a gaming or amusement machine. The ring 51 also has an opaque region 53 with a symbol 54 printed on it. An alternative version of the ring has no opaque region.

In use the ring 51 is applied over a reel of a fruit machine with the numbers 52 superimposed over selected fruit. Thus the user sees the number and fruit together, but the manufacture of the reel is made easier since all the fruit of one kind ran be identical without having to take into account what "bonus" or credit point value they will have to display.

The ring 51 is applied in use over reels using any of the reel-strips shown in FIGS. 1 to 8.

Figure 10:
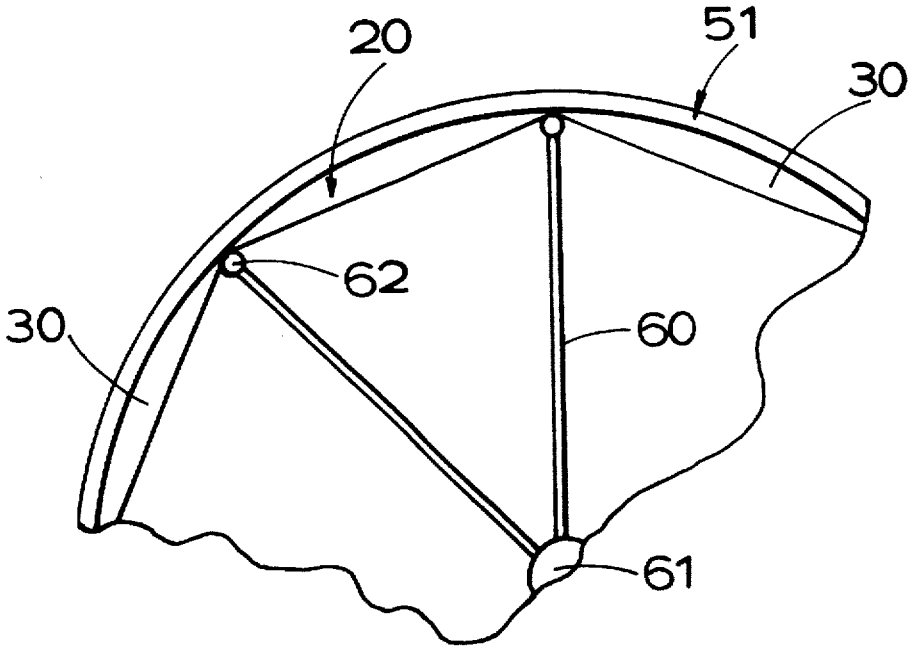
FIG. 10 shows a schematic side view of part of a reel in accordance with the invention.

FIG. 10 shows a strip similar to that of FIG. 9, but with no opaque region, applied over the reel-strip of FIGS. 7 and 8, and using a spider, comprising support means, to hold the strip in a cylindrical configuration. The spider comprises radial arms 60 connected to a hub 61 and to transverse cross-members 62. The strip 50 is positioned over the strip 20 and secured relative to it (for example by gluing it, welding it, or by means of complementary formations) and the combined two layer strip formed into a closed ring. Alternatively the strip 50 could be formed into a ring and then applied over the strip 20. There may be no need to provide any positive location of the ring 81 relative to the strip 20.

A strip similar to strip 50 could of course be used in conjunction with conventional flat strips or films having fruit printed on them, with savings in the number of different types of fruit prints needed.

The number strip could be provided alongside the fruit strip, instead of one superimposed above the other.

I claim:

1. A reel for a gaming or amusement machine comprising a first reel strip, a second reel strip, and a support structure, said support structure supporting said first reel strip and said second reel strip in a curved configuration, said second reel strip overlies said first reel strip and said first reel strip and said second reel strip being provided with indicia or symbols, wherein the symbols on said first and second reel strips are superimposed said first reel strip and said second reel strip are fixed in position relative to one another on said support structure, wherein the symbols on said first reel strip and the symbols on said second reel strip remain in a fixed superimposed position relative to one another at all times.

2. A reel according to claim 1, wherein said first reel strip has profiled symbols formed in or on it in three dimensions.

3. A reel according to claim 1, wherein said first reel strip has a uniformly smooth surface and has said symbols printed upon it.

4. A reel according to claim 1, wherein said first and said second reel strips are secured to each other.

5. A reel according to claim 1, wherein said second reel strip is transparent except for its symbols or indicia, and in that all of said symbols or indicia of said first strip can be identified despite the presence of said indicia or symbols of said second strip.

6. A reel strip for use in forming a reel in accordance with claim 1, said reel strip being generally transparent but carrying symbols or indicia and being adapted to be applied over or alongside an existing reel or reel strip.

7. A gaming or amusement machine which includes a reel in accordance with claim 1.

8. A method of forming a reel for gaming or amusement machines comprising taking a reel strip in accordance with claim [9] *1* and applying it to a reel.

9. A reel for a gaming or amusement machine comprising a first reel strip, a second reel strip, and a support structure, said support structure supporting said first reel strip and said second reel strip in a curved configuration, said first reel strip and said second reel strip being provided with indicia or symbols, wherein the arrangement is such that at at least one angular position of said reel said first reel strip and said second reel strip each have indicia, one of said indicia on said second reel strip being superimposed upon one of said indicia on said first reel strip at said one angular position and said superimposed symbols being simultaneously visible at all times when registered with a viewing window of said amusement or gaming machine.

10. A reel for a gaming or amusement machine comprising a first reel strip, a second reel strip, and a support structure, said support structure supporting said first reel strip and said second reel strip in a curved configuration, said first reel strip and said second reel strip being provided with indicia or symbols, wherein said second reel strip overlies said first reel strip, said second reel strip is generally transparent and the arrangement is such that at at least one angular position of said reel said first reel strip and said second reel strip each have indicia, at least some of said indicia on said first reel strip being visible through said second reel strip.

11. A reel for a gaming or amusement machine comprising a first reel strip, a second reel strip, and a support structure, said support structure supporting said first reel strip and said second reel strip in a curved configuration, said second reel strip overlies said first reel strip and said first reel strip and said second reel strip being provided with indicia or symbols, wherein the symbols on said first and second reel strips are preimposed and said first reel strip and said second reel strip are fixed in position relative to one another, wherein the symbols on said first reel strip and the symbols on said second reel strip remain in a fixed superimposed position relative to one another at all times said first reel strip is provided with sunken regions, said indicia or symbols being provided in said sunken regions.

12. A two layer reel strip for use in a reel or a gaming or amusement machine comprising a first reel strip and a second reel strip, said second reel strip being positioned above said first reel strip, said first and said second reel strip being provided with indicia or symbols, wherein said first reel strip and said second reel strip are fixed relative to one another wherein the symbols on said first reel strip and the symbols on said second reel strip remain in a fixed superimposed position relative to one another at all times.

* * * * *